United States Patent
Ettireddy et al.

(10) Patent No.: US 9,551,257 B1
(45) Date of Patent: Jan. 24, 2017

(54) ARRANGEMENT OF CATALYZED TEG SYSTEMS

(71) Applicant: Tenneco Automotive Operating Company Inc., Lake Forest, IL (US)

(72) Inventors: Padmanabha Reddy Ettireddy, Canton, MI (US); Adam J. Kotrba, Laingsburg, MI (US); Timothy P. Gardner, Canton, MI (US); Michael Golin, Dexter, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 14 days.

(21) Appl. No.: 14/809,730

(22) Filed: Jul. 27, 2015

(51) Int. Cl.
| | | |
|---|---|---|
| *F01N 5/02* | (2006.01) | |
| *F01N 3/08* | (2006.01) | |
| *F01N 3/10* | (2006.01) | |
| *F01N 13/00* | (2010.01) | |
| *F02G 5/02* | (2006.01) | |
| *F28D 21/00* | (2006.01) | |
| *F01N 3/021* | (2006.01) | |
| *F01N 3/20* | (2006.01) | |

(52) U.S. Cl.
CPC .............. *F01N 5/025* (2013.01); *F01N 3/021* (2013.01); *F01N 3/0842* (2013.01); *F01N 3/101* (2013.01); *F01N 3/103* (2013.01); *F01N 3/106* (2013.01); *F01N 3/2066* (2013.01); *F01N 13/009* (2014.06); *F01N 2340/06* (2013.01); *F02G 5/02* (2013.01); *F28D 21/0003* (2013.01); *Y02T 10/166* (2013.01)

(58) Field of Classification Search
CPC ........ F01N 3/021; F01N 3/0842; F01N 3/101; F01N 3/103; F01N 3/106; F01N 3/2066; F01N 5/025; F01N 13/009; F01N 2340/06; F02G 5/02; F28D 21/0003; Y02T 10/166
USPC .................. 60/280, 297, 299, 301, 311, 320
See application file for complete search history.

(56) References Cited

U.S. PATENT DOCUMENTS

| | | |
|---|---|---|
| 3,070,645 A | 12/1962 | Tracht |
| 6,986,247 B1 | 1/2006 | Parise |
| 7,523,607 B2 | 4/2009 | Sullivan |
| 7,610,993 B2 | 11/2009 | Sullivan |
| 7,687,704 B2 | 3/2010 | Shimoji et al. |
| 8,309,044 B2 | 11/2012 | Backhaus-Ricoult et al. |
| 8,656,710 B2 | 2/2014 | Bell et al. |

(Continued)

FOREIGN PATENT DOCUMENTS

| | | |
|---|---|---|
| DE | 102008002095 A1 | 12/2009 |
| DE | 102009032038 A1 | 1/2011 |

(Continued)

*Primary Examiner* — Jorge Leon, Jr.
(74) *Attorney, Agent, or Firm* — Harness, Dickey & Pierce, P.L.C.

(57) ABSTRACT

An exhaust aftertreatment system may include an aftertreatment component and thermoelectric generators. The aftertreatment component is disposed in an exhaust gas passageway. The thermoelectric generators may be disposed in the exhaust gas passageway upstream or downstream of the aftertreatment component. Each of the thermoelectric generators may have a catalytic coating and may include a radially extending fin configured to absorb heat from exhaust gas in the exhaust gas passageway. The fin of at least one of the thermoelectric generators may overlap the fin of at least another one of the thermoelectric generators.

38 Claims, 10 Drawing Sheets

(56) References Cited

U.S. PATENT DOCUMENTS

| | | |
|---|---|---|
| 8,713,924 B2 | 5/2014 | Bruck et al. |
| 8,881,513 B2 | 11/2014 | Bruck et al. |
| 2003/0223919 A1 | 12/2003 | Kwak et al. |
| 2005/0172993 A1 | 8/2005 | Shimoji et al. |
| 2006/0179820 A1* | 8/2006 | Sullivan ............... F01N 3/18 60/275 |
| 2010/0154396 A1 | 6/2010 | Hahnl et al. |
| 2011/0197941 A1 | 8/2011 | Dannoux et al. |
| 2013/0004392 A1 | 1/2013 | Roy et al. |
| 2013/0104953 A1 | 5/2013 | Poliquin et al. |
| 2013/0152561 A1 | 6/2013 | An et al. |
| 2013/0186448 A1* | 7/2013 | Ranalli ............... F01N 5/025 136/204 |
| 2013/0255742 A1 | 10/2013 | Lampenscherf |
| 2013/0298955 A1 | 11/2013 | Limbeck et al. |
| 2014/0096685 A1 | 4/2014 | Backhaus-Ricoult et al. |
| 2014/0150413 A1 | 6/2014 | Backhaus-Ricoult et al. |

FOREIGN PATENT DOCUMENTS

| | | |
|---|---|---|
| JP | 2004360522 A | 12/2004 |
| WO | WO-2010112958 A1 | 10/2010 |
| WO | WO-2011117222 A1 | 9/2011 |
| WO | WO-2012046170 A1 | 4/2012 |

* cited by examiner

ARRANGEMENT OF CATALYZED TEG SYSTEMS

FIELD

The present disclosure relates to an exhaust aftertreatment system having a catalyzed TEG (thermoelectric generator) system.

BACKGROUND

This section provides background information related to the present disclosure and is not necessarily prior art.

In an attempt to reduce the quantity of undesirable matter (e.g., $NO_x$, hydrocarbons, carbon monoxide, and/or particulate matter) discharged to the atmosphere during internal combustion engine operation, a number of exhaust aftertreatment devices have been developed. Typical aftertreatment systems for combustion engine exhaust may include an oxidation catalyst (e.g., a diesel oxidation catalyst or DOC), a particulate filter (e.g., a diesel particulate filter or DPF), a selective catalytic reduction (SCR) system, and/or other aftertreatment components.

Thermoelectric generator (TEG) systems can be employed to generate electrical energy from heat energy in a stream of exhaust gas. Such electrical energy can be used to power various electrical accessories or subsystems of a vehicle, for example. That is, TEG cartridges can be positioned within an exhaust gas passageway of an exhaust aftertreatment system to absorb heat from the exhaust gas therein so that TEG system can convert the heat to electrical energy. TEG cartridges can be catalyzed (e.g., coated with a catalytic substance) so that the TEG cartridges can treat the exhaust gas to reduce the quantity of undesirable constituents in the exhaust gas.

SUMMARY

This section provides a general summary of the disclosure, and is not a comprehensive disclosure of its full scope or all of its features.

In one form, the present disclosure provides an exhaust aftertreatment system that may include an aftertreatment component and thermoelectric generators. The aftertreatment component is disposed in an exhaust gas passageway. The thermoelectric generators may be disposed in the exhaust gas passageway upstream of the aftertreatment component. Each of the thermoelectric generators may have a catalytic coating and may include a radially extending fin configured to absorb heat from exhaust gas in the exhaust gas passageway. The fin of at least one of the thermoelectric generators may overlap the fin of at least another one of the thermoelectric generators.

In some configurations, the fin of at least one of the thermoelectric generators is interleaved with the fin of at least another one of the thermoelectric generators.

In some configurations, each of the thermoelectric generators includes a plurality of fins that extend radially outward and extend longitudinally from a first axial end of the thermoelectric generator to a second axial end of the thermoelectric generator.

In some configurations, the fins are disk-shaped.

In some configurations, each thermoelectric generator has a plurality of disk-shaped fins spaced axially apart from each other.

In some configurations, the fins have helical shapes.

In some configurations, the helical fins are defined by rotational axes that are perpendicular to a direction of flow through the exhaust gas passageway.

In some configurations, each of the thermoelectric generators includes a plurality of helical fins.

In some configurations, the plurality of helical fins of each thermoelectric generator are defined by a common rotational axis and are rotationally offset from each other and interleaved with each other.

In some configurations, a catalyst of the catalytic coating could include a hydrocarbon catalyst or a CO oxidation catalyst.

In some configurations, a catalyst of the catalytic coating is selected from the group consisting of: a three-way catalyst, a platinum-group metal catalyst, a lean $NO_x$ trap catalyst, and a hydrocarbon lean $NO_x$ catalyst.

In some configurations, the aftertreatment component is selected from the group consisting of: an oxidation catalyst, a particulate filter, and a selective catalytic reduction catalyst.

In some configurations, the thermoelectric generators are disposed upstream of a turbocharger.

In some configurations, the thermoelectric generators are disposed upstream of a particulate filter.

In some configurations, the thermoelectric generators are disposed downstream of a turbocharger and upstream of a particulate filter.

In some configurations, the thermoelectric generators function as an oxidation catalyst.

In some configurations, the thermoelectric generators are disposed downstream of a turbocharger and a particulate filter and upstream of a selective catalytic reduction catalyst.

In another form, the present disclosure provides an exhaust aftertreatment system that may include an aftertreatment component and thermoelectric generators. The aftertreatment component is disposed in an exhaust gas passageway. The thermoelectric generators may be disposed in the exhaust gas passageway downstream of the aftertreatment component. Each of the thermoelectric generators may have a catalytic coating and may include a radially extending fin configured to absorb heat from exhaust gas in the exhaust gas passageway. The fin of at least one of the thermoelectric generators may overlap the fin of at least another one of the thermoelectric generators.

In some configurations, each of the thermoelectric generators includes a plurality of fins that extend radially outward and extend longitudinally from a first axial end of the thermoelectric generator to a second axial end of the thermoelectric generator.

In some configurations, the fins are disk-shaped.

In some configurations, each thermoelectric generator has a plurality of disk-shaped fins spaced axially apart from each other.

In some configurations, the fins have helical shapes.

In some configurations, the helical fins are defined by rotational axes that are perpendicular to a direction of flow through the exhaust gas passageway.

In some configurations, each of the thermoelectric generators includes a plurality of helical fins.

In some configurations, the plurality of helical fins of each thermoelectric generator are defined by a common rotational axis and are rotationally offset from each other and interleaved with each other.

In some configurations, a catalyst of the catalytic coating is selected from the group consisting of: a three-way catalyst, a platinum-group metal catalyst, a lean $NO_x$ trap catalyst, and a hydrocarbon lean $NO_x$ catalyst.

In some configurations, the aftertreatment component is selected from the group consisting of: an oxidation catalyst, a particulate filter, and a selective catalytic reduction catalyst.

In some configurations, the thermoelectric generators are disposed downstream of a turbocharger and a particulate filter.

In some configurations, the thermoelectric generators are disposed upstream of a selective catalytic reduction catalyst.

In some configurations, the catalyst coating is a selective catalytic reduction coating.

In another form, the present disclosure provides an exhaust aftertreatment system that may include an exhaust gas passageway and a thermoelectric generator system. The exhaust gas passageway receives exhaust gas from a combustion engine. The thermoelectric generator system is disposed in the exhaust gas and may include a plurality of catalyst-coated cartridges each having a helical fin configured to absorb heat from exhaust gas in the exhaust gas passageway. The helical fins may be defined by rotational axes that are perpendicular to a direction of flow through the exhaust gas passageway. The fin of at least one of the cartridges may be interleaved with the fin of at least another one of the cartridges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
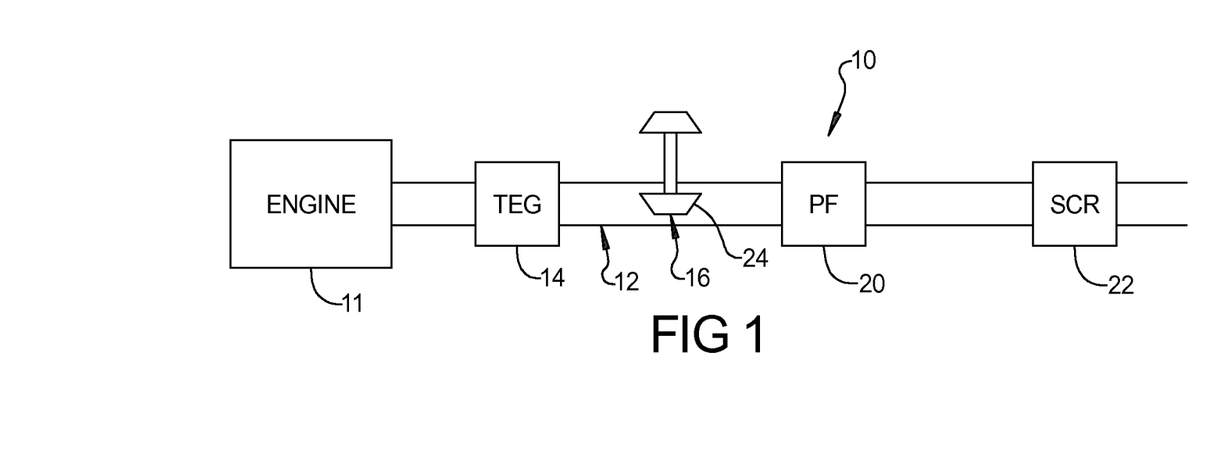
FIG. 1 is a schematic representation of an exhaust aftertreatment system having a TEG assembly according to the principles of the present disclosure.

With reference to FIG. 1, an exhaust aftertreatment system 10 is provided that may include an exhaust gas passageway 12 that may house a thermoelectric generator (TEG) system 14, a turbocharger 16, and one or more exhaust aftertreatment devices such as a particulate filter (e.g., a diesel particulate filter) 20 and/or a selective catalytic reduction (SCR) catalyst 22, for example. In some configurations, additional or alternative exhaust aftertreatment devices (e.g., catalysts, filters and/or traps) could be disposed within the exhaust gas passageway 12. The exhaust gas passageway 12 may receive exhaust gas discharged from a combustion engine 11. The exhaust aftertreatment devices may reduce the quantity of undesirable matter (e.g., $NO_x$, hydrocarbons, carbon monoxide, and particulate matter) from the exhaust gas flowing through the exhaust gas passageway 12. It will be appreciated that the exhaust aftertreatment system 10 could be configured for a gasoline engine or a diesel engine (or for an engine powered by any other fuel). Exhaust gas flowing through the exhaust gas passageway 12 may provide heat for the TEG system 14 and may power a turbine 24 of the turbocharger 16. The TEG system 14 can convert heat energy from the exhaust gas into electrical energy that can be used to power electrical systems and accessories in a vehicle, for example.

In the particular configuration shown in FIG. 1, the TEG system 14 is disposed upstream of the turbocharger 16, which is disposed upstream of the exhaust aftertreatment devices (e.g., particulate filter 20, and SCR catalyst 22). Having the TEG system 14 disposed upstream of the turbocharger 16 places the TEG system 14 in closer proximity to the engine 11, which exposes the TEG system 14 to higher exhaust temperatures, which increases the electrical power production of the TEG system 14.

Figure 2:
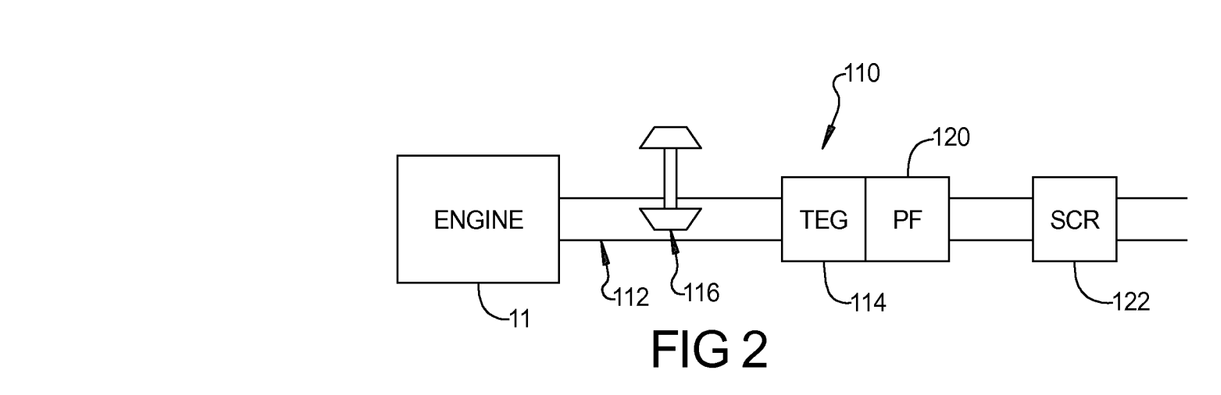
FIG. 2 is a schematic representation of another exhaust aftertreatment system having a TEG assembly according to the principles of the present disclosure.

FIG. 2 depicts another exhaust aftertreatment system 110 that includes an exhaust gas passageway 112 that receives exhaust gas from the engine 11 and may house a TEG system 114, a turbocharger 116, a particulate filter 120 and an SCR catalyst 122. The turbocharger 116, particulate filter 120 and SCR catalyst 122 may be similar or identical to the turbocharger 16, particulate filter 20 and SCR catalyst 22 described above. The TEG system 114 can be generally similar to the TEG system 14 described above, except that the TEG system 114 is disposed downstream of the turbocharger 116. The TEG system 114 may be disposed upstream of the particulate filter 120 and the SCR catalyst 122.

Figure 3:
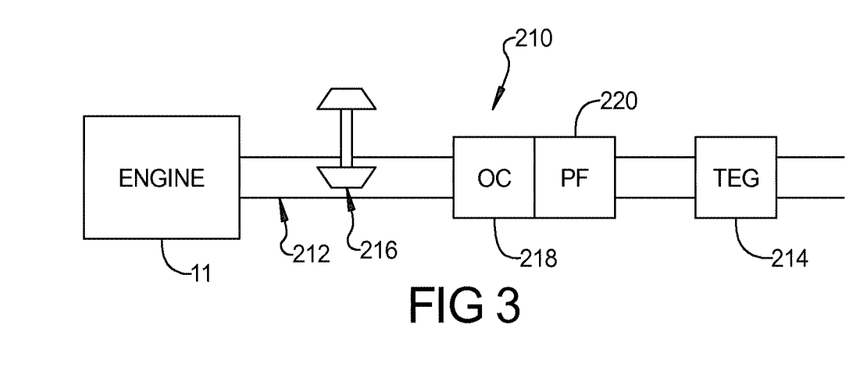
FIG. 3 is a schematic representation of another exhaust aftertreatment system having a TEG assembly according to the principles of the present disclosure.

FIG. 3 depicts another exhaust aftertreatment system 210 that includes an exhaust gas passageway 212 that receives exhaust gas from the engine 11 and may house a TEG system 214, a turbocharger 216, an oxidation catalyst (e.g., a diesel oxidation catalyst) 218, and a particulate filter 220. The turbocharger 216 and particulate filter 220 may be similar or identical to the turbocharger 16 and particulate filter 20 described above. The TEG system 214 can be generally similar to the TEG system 14 described above, except that the TEG system 214 is disposed downstream of the turbocharger 216, the oxidation catalyst 218 and the particulate filter 220.

Figure 4:
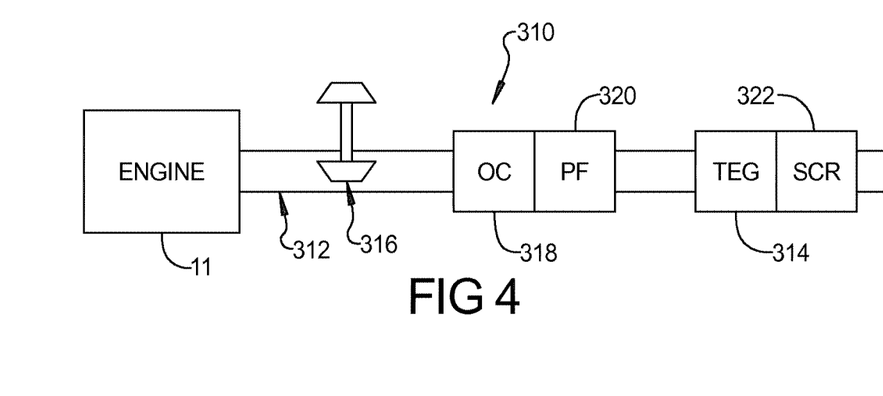
FIG. 4 is a schematic representation of another exhaust aftertreatment system having a TEG assembly according to the principles of the present disclosure.

FIG. 4 depicts another exhaust aftertreatment system 310 that includes an exhaust gas passageway 312 that receives exhaust gas from the engine 11 and may house a TEG system 314, a turbocharger 316, an oxidation catalyst 318, a particulate filter 320 and an SCR catalyst 322. The turbocharger 316, oxidation catalyst 318 and particulate filter 320 may be similar or identical to the turbocharger 16, oxidation catalyst 218 and particulate filter 20 described above. The TEG system 314 can be generally similar to the TEG system 14 described above, except that the TEG system 314 is disposed downstream of the turbocharger 316, the oxidation catalyst 318 and the particulate filter 320. The TEG system 314 is disposed upstream of the SCR catalyst 322. In some configurations, the TEG system 314 could be disposed downstream of the SCR catalyst 322. In some configurations, a reductant injector (not shown) could be disposed upstream of the TEG system 314 or between the TEG system 314 and the SCR catalyst 322. In some configurations, the system 310 could include multiple SCR catalysts 322 and/or one or more SCR coated TEG systems 314.

The TEG systems 14, 114, 214, 314 may include one or more thermoelectric generators or cartridges 26 (shown schematically in FIG. 5) that may be at least partially coated with a catalytic material and/or at least partially formed from a catalytic substrate. The catalytic coating or substrate can be or include a three-way catalyst (TWC), a platinum-group metal (PGM) catalyst, a lean $NO_x$ trap (LNT) catalyst, a hydrocarbon lean $NO_x$ catalyst (HCLNC), or an SCR catalyst, for example. In some configurations, the cartridges 26 could be coated with or include a $CO_2$ capture and/or $NO_x$ storage catalyst, for example.

Coating the cartridges 26 of the TEG system 14, 114, 214, 314 with a TWC provides several functions and advantages. For example, such cartridges 26 can generate electrical power while simultaneously acting as a three-way catalyst for conversion of HC, CO and $NO_x$ for gasoline-engine applications. The TWC coated cartridges 26 can be placed closer to the engine 11 (e.g., upstream of the turbocharger 16, as shown in FIG. 1) to more efficiently generate electrical power. Combining the functionality of a TWC and a TEG in a single structure can decrease the cost and complexity of the system 10 while also reducing the packaging space required for such functionality. Further, combining this functionality also decreases the back pressure in the exhaust gas passageway 12. In some configurations, it may be more efficient to provide relatively fewer TWC coated cartridges 26 at an inlet face of the TEG system 14, 114, 214, 314 and relatively more TWC coated cartridges 26 at or near an outlet face of the TEG system 14, 114, 214, 314. Such a configuration may reduce heat loss and produce more electrical power.

Coating the cartridges 26 of the TEG system 14, 114, 214, 314 with a PGM provides several functions and advantages. For example, when such cartridges 26 are disposed upstream of the particulate filter 20, 120, 220, 320, the cartridges 26 can act as an oxidation catalyst for oxidation of HC and CO. During active regeneration of the particulate filter 20, 120, 220, 320, a PGM coated cartridge 26 can produce more heat (similar to a convention DOC) due to the exothermic nature of an HC oxidation reaction. Further, the PGM coated cartridges 26 may also generate more electric power during the active regeneration due to increased level of heat. During the normal engine operation, the PGM coated cartridges 26 may generate more electrical power compared to a conventional TEG system since the PGM coated cartridges 26 may be disposed in close proximity to the engine 11. Combining the functionality of a DOC and a TEG in a single structure can decrease the cost and complexity of the system 10 while also reducing the packaging space required for such functionality. Further, combining this functionality also decreases the back pressure in the exhaust gas passageway 12. In some configurations, it may be more efficient to provide relatively fewer PGM coated cartridges 26 at an inlet face of the TEG system 14, 114, 214, 314 and relatively more PGM coated cartridges 26 at or near an outlet face of the TEG system 14, 114, 214, 314. Such a configuration may reduce heat loss and produce more electrical power.

Coating the cartridges 26 of the TEG system 14, 114, 214, 314 with an LNT provides several functions and advantages. For example, such cartridges 26 can perform HC and CO oxidation, NO$_x$ reduction, NH$_3$ generation, and electric power generation. Combining such functionality into a single system can reduce cost and packaging space while producing more electrical power. Similarly, SCR and HCLNC coated cartridges 26 also provide the advantages of reducing cost and packaging space and generating more electrical power. As described above, decreasing the catalyst loading on the cartridges 26 or surfaces at or near the inlet of the TEG system 14, 114, 214, 314 and increasing catalyst loading on the cartridges 26 or surfaces at or near the outlet of the TEG system 14, 114, 214, 314 can improve the effectiveness of the TEG system 14, 114, 214, 314.

Figure 5:
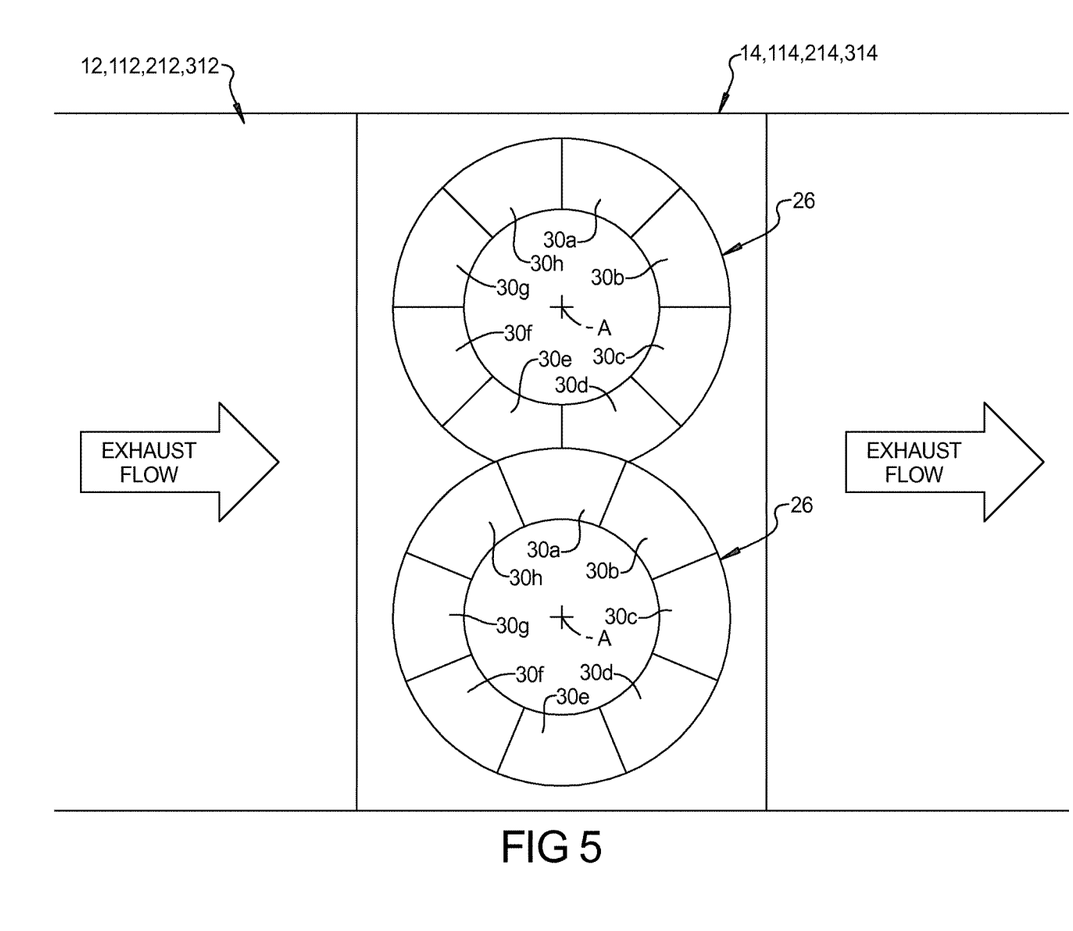
FIG. 5 is a schematic plan view of cartridges of the TEG assembly installed in an exhaust gas passageway of any of the exhaust aftertreatment systems of FIGS. 1-4.
Figure 6:
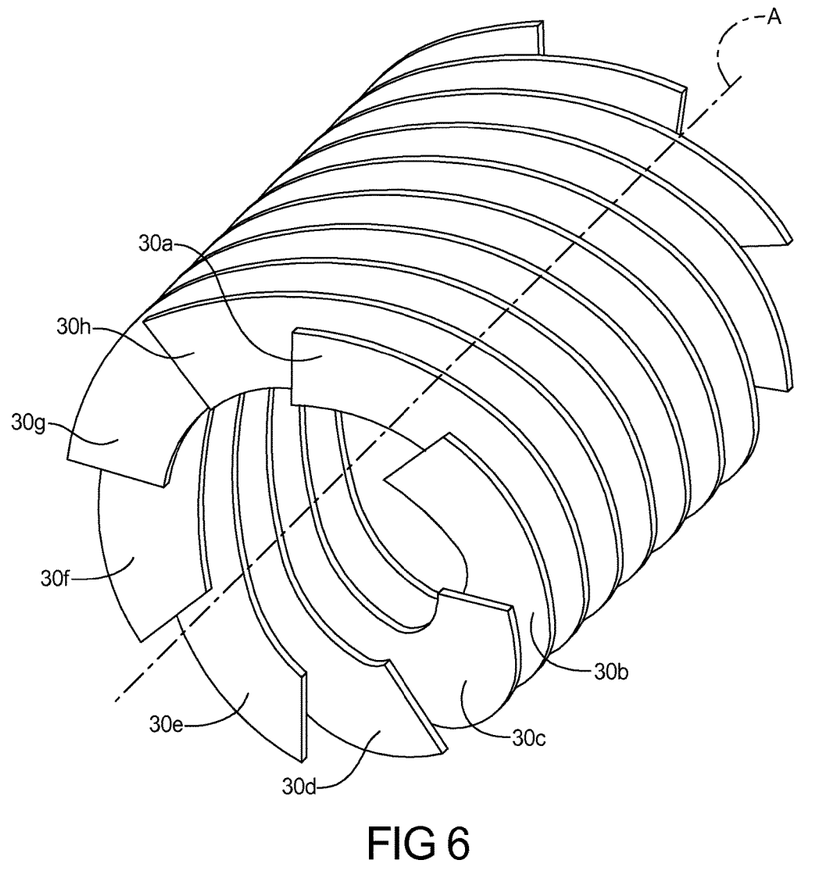
FIG. 6 is a perspective view of a set of fins of one of the cartridges of FIG. 5.
Figure 7:
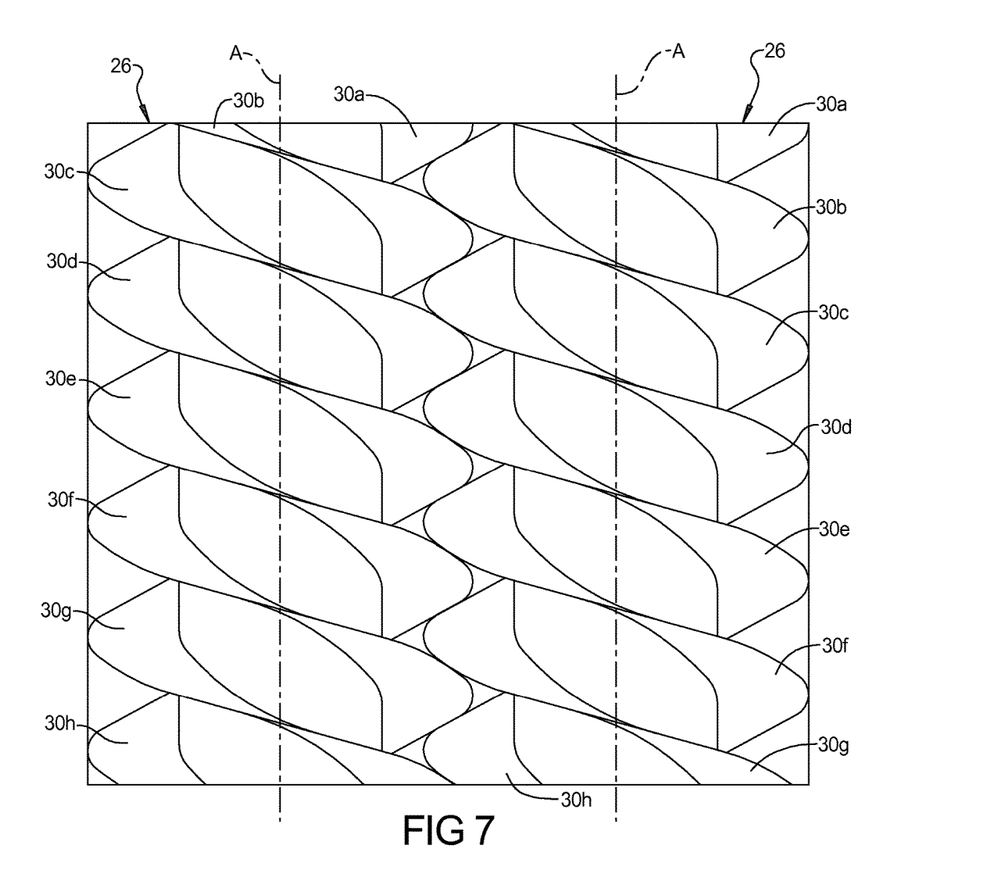
FIG. 7 is a side view of the sets of fins of the cartridges of FIG. 5.

Referring now to FIGS. 5-7, each of the cartridges 26 of the TEG systems 14, 114, 214, 314 may include one or more radially extending fins 30a, 30b, 30c, 30d, 30e, 30f, 30g, 30h that facilitate the absorption of heat from exhaust gas flowing through the exhaust gas passageway 12, 112, 212, 312. While FIG. 5 depicts the TEG system 14, 114, 214, 314 having a pair of cartridges 26, it will be appreciated that the TEG system 14, 114, 214, 314 can have only one cartridge 26 or more than one cartridge 26. In the configuration shown in FIGS. 5-7, each cartridge 26 includes a plurality of fins 30a, 30b, 30c, 30d, 30e, 30f, 30g, 30h. The fins 30a, 30b, 30c, 30d, 30e, 30f, 30g, 30h may be coated with one or more of the catalysts described above (e.g., TWC, OC, PGM, LNT, HCLNC, SCR, CO$_2$ capture, NO absorber, CSC, etc.).

Each fin 30a, 30b, 30c, 30d, 30e, 30f, 30g, 30h is substantially helical and is rotationally (angularly) offset relative to the rest of the fins 30a, 30b, 30c, 30d, 30e, 30f, 30g, 30h of the same cartridge 26. In this manner, the fins 30a, 30b, 30c, 30d, 30e, 30f, 30g, 30h of a particular cartridge 26 are interleaved with each other, and the helical shapes of the fins 30a, 30b, 30c, 30d, 30e, 30f, 30g, 30h of a particular cartridge 26 are all defined by a common rotational axis A. The rotational axes A of the cartridge 26 may be substantially parallel to each other and perpendicular to a direction of exhaust gas flow through the exhaust gas passageway 12, 112, 212, 312, as shown in FIG. 5. As shown in FIG. 7, the fins 30a, 30b, 30c, 30d, 30e, 30f, 30g, 30h of a particular cartridge 26 can be overlapped with or interleaved with the fins 30a, 30b, 30c, 30d, 30e, 30f, 30g, 30h of one or more adjacent cartridges 26. The configuration of the fins 30a, 30b, 30c, 30d, 30e, 30f, 30g, 30h of the cartridges 26 shown in FIGS. 5-7 increases the surface area of the cartridges 26 that are exposed to the exhaust gas, thereby improving heat absorption and electrical energy production. Furthermore, interleaving the fins 30a, 30b, 30c, 30d, 30e, 30f, 30g, 30h in the manner described above and shown in the figures allows for more fins to fit within a given space without detrimentally increasing back pressure in the exhaust gas passageway 12.

Figure 8:
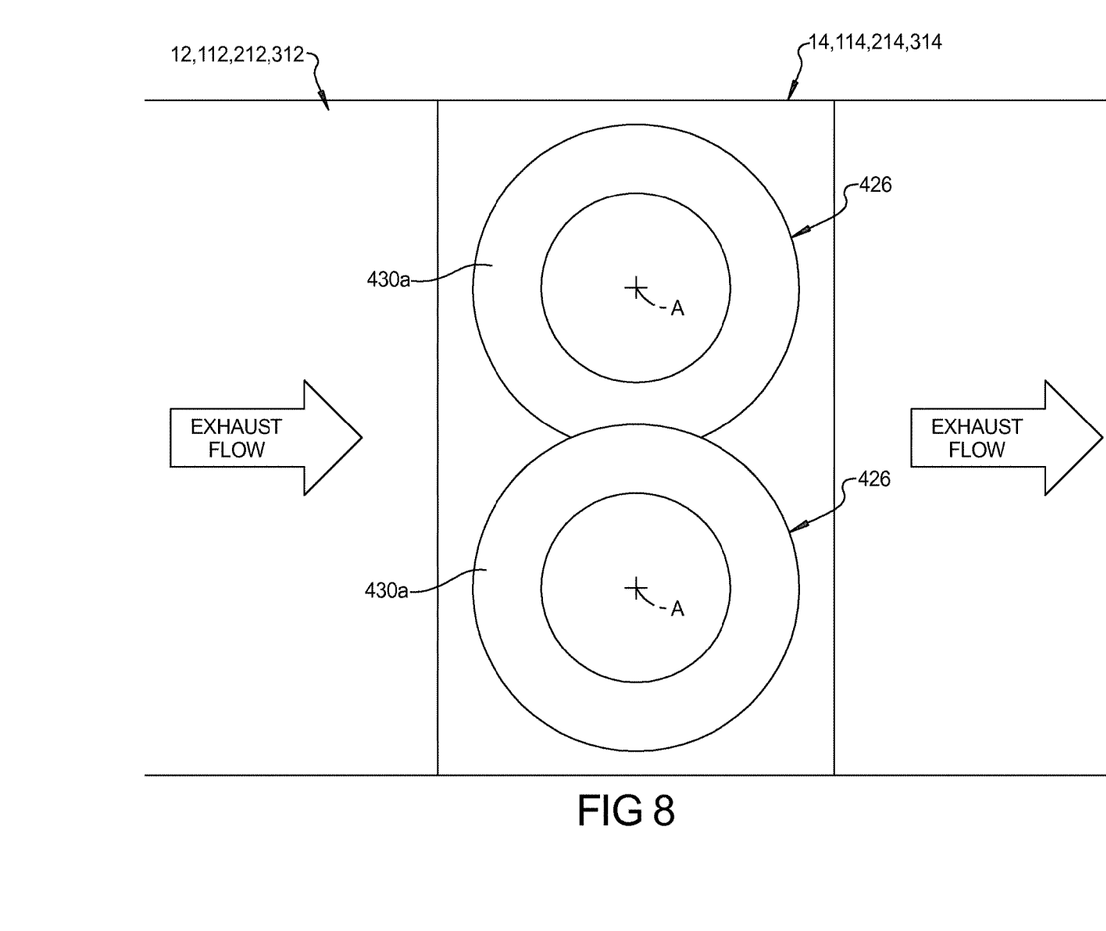
FIG. 8 is a schematic plan view of other cartridges installed in an exhaust gas passageway of any of the exhaust aftertreatment systems of FIGS. 1-4.
Figure 9:
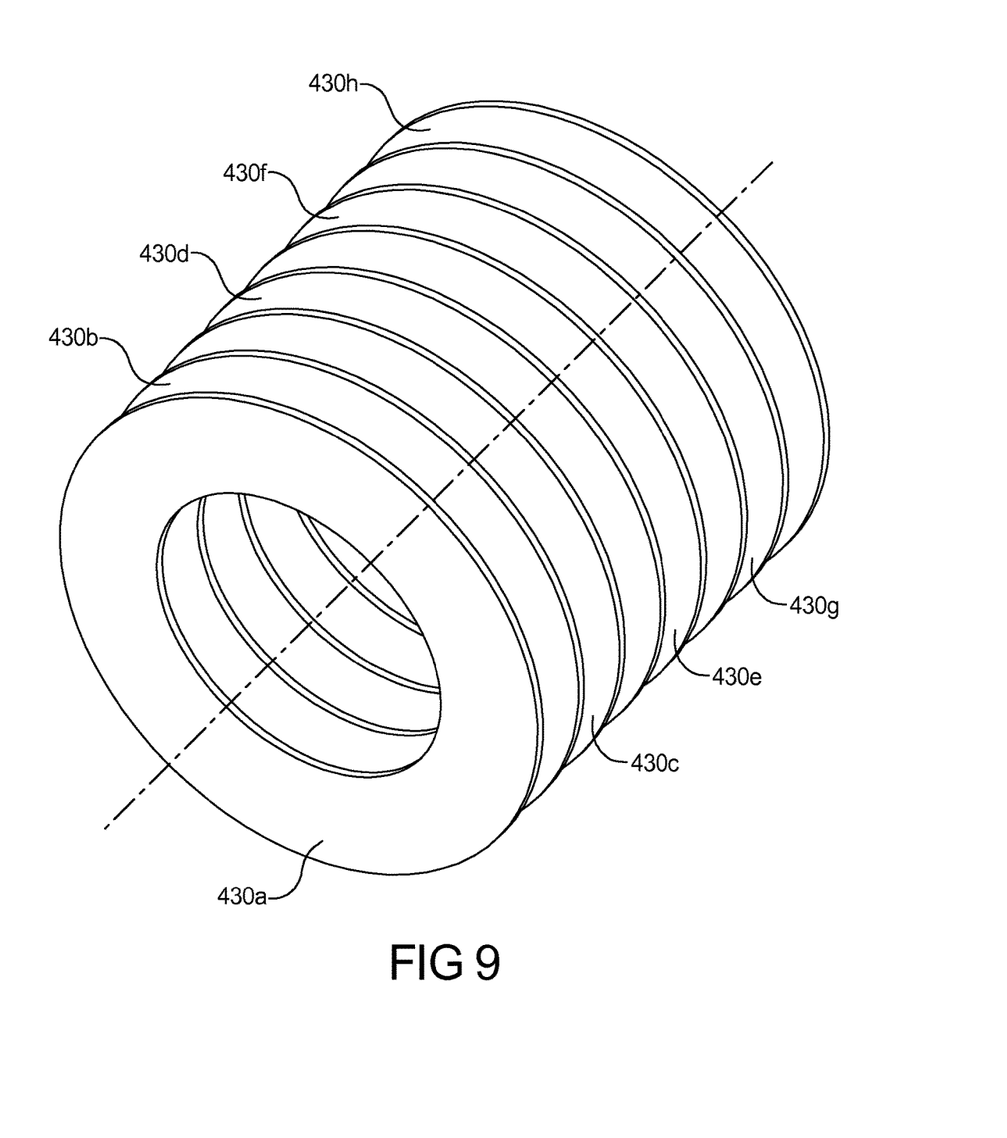
FIG. 9 is a perspective view of a set of fins of one of the cartridges of FIG. 8.
Figure 10:
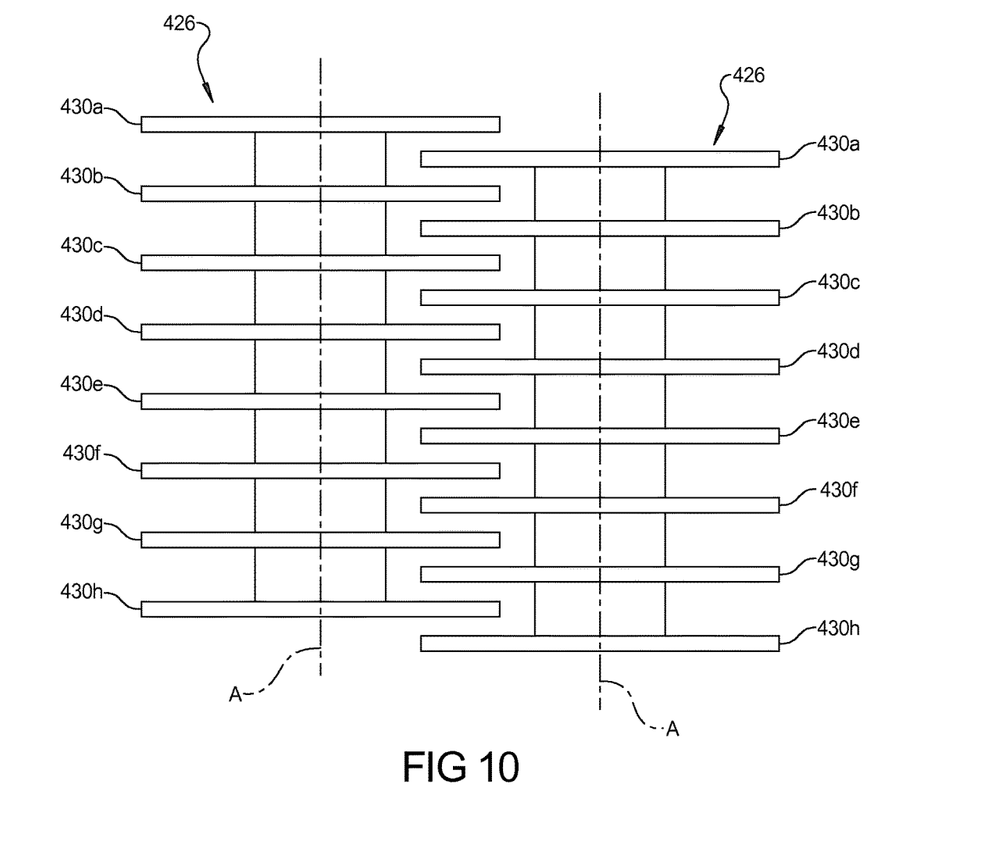
FIG. 10 is a side view of the sets of fins of the cartridges of FIG. 8.

Referring now to FIGS. 8-10, another set of cartridges 426 are provided that may be incorporated into the TEG system 14, 114, 214, 314 instead of or in addition to the cartridges 26. Each of the cartridges 426 may include one or more radially extending fins 430a, 430b, 430c, 430d, 430e, 430f, 430g, 430h that facilitate the absorption of heat from exhaust gas flowing through the exhaust gas passageway 12, 112, 212, 312. While FIG. 8 depicts the TEG system 14, 114, 214, 314 having a pair of cartridges 426, it will be appreciated that the TEG system 14, 114, 214, 314 can have any number of cartridges 426. The fins 430a, 430b, 430c, 430d, 430e, 430f, 430g, 430h may be coated with one or more of the catalysts described above (e.g., TWC, PGM, LNT, HCLNC, SCR, etc.).

The fins 430a, 430b, 430c, 430d, 430e, 430f, 430g, 430h of each cartridge 426 may be flat disks extending around a common longitudinal axis A. Each of the fins 430a, 430b, 430c, 430d, 430e, 430f, 430g, 430h may be axially offset from each other (i.e., spaced apart from each other in a direction parallel to longitudinal axis A). In this manner, the fins 30a, 30b, 30c, 30d, 30e, 30f, 30g, 30h of a particular cartridge 426 may be interleaved with each other. The rotational axes A of the cartridges 426 may be substantially parallel to each other and perpendicular to a direction of exhaust gas flow through the exhaust gas passageway 12, 112, 212, 312, as shown in FIG. 8. As shown in FIG. 10, the fins 430a, 430b, 430c, 430d, 430e, 430f, 430g, 430h of a particular cartridge 426 can be overlapped with or interleaved with the fins 430a, 430b, 430c, 430d, 430e, 430f, 430g, 430h of one or more adjacent cartridges 426.

While the longitudinal axes A of the cartridges 426 are shown in the figures and described above as being parallel to each other, in some configurations, the longitudinal axes A could be angled relative to each other. In some configurations, such an orientation of the cartridges may improve heat transfer between the exhaust gas and the cartridges 426.

Figure 11:
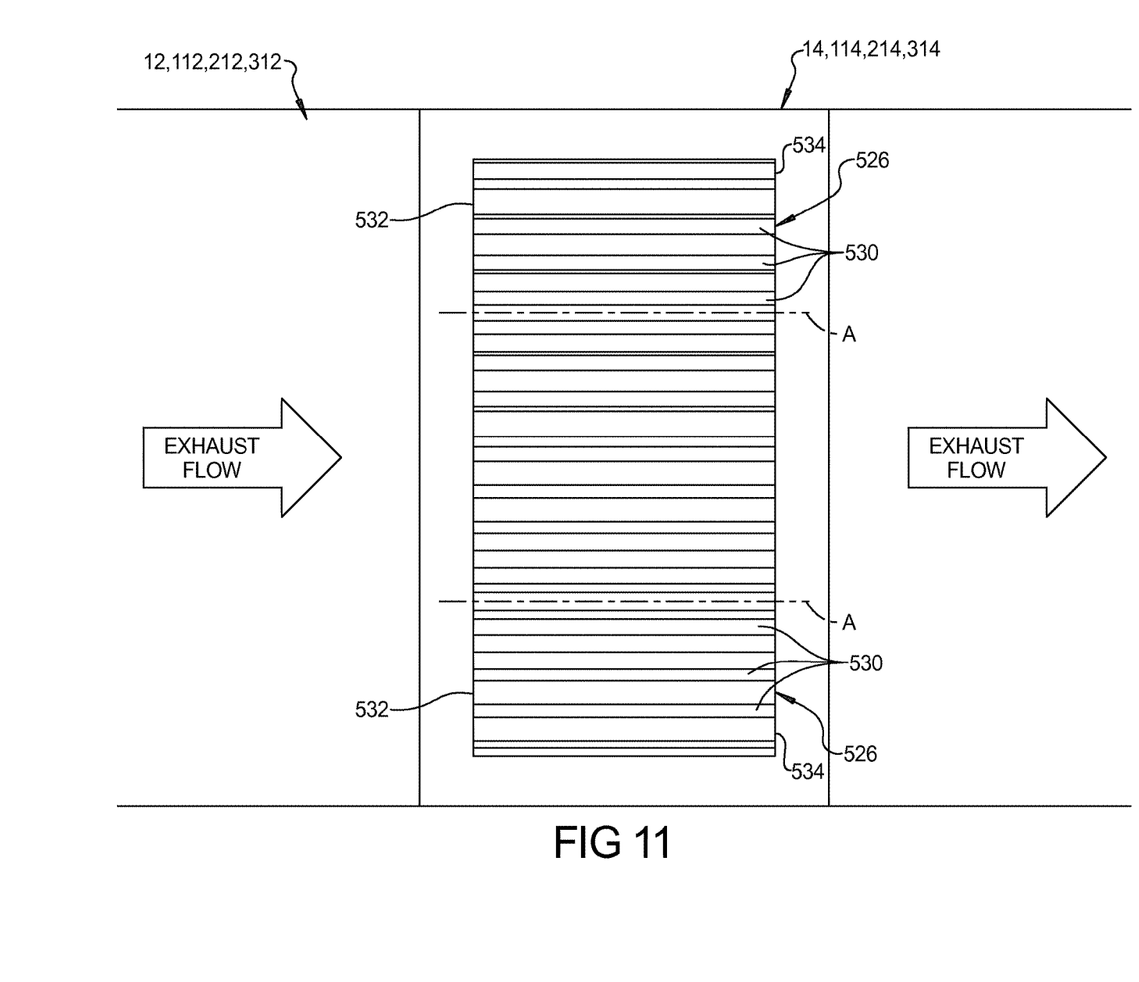
FIG. 11 is a schematic plan view of other cartridges installed in an exhaust gas passageway of any of the exhaust aftertreatment systems of FIGS. 1-4.
Figure 12:
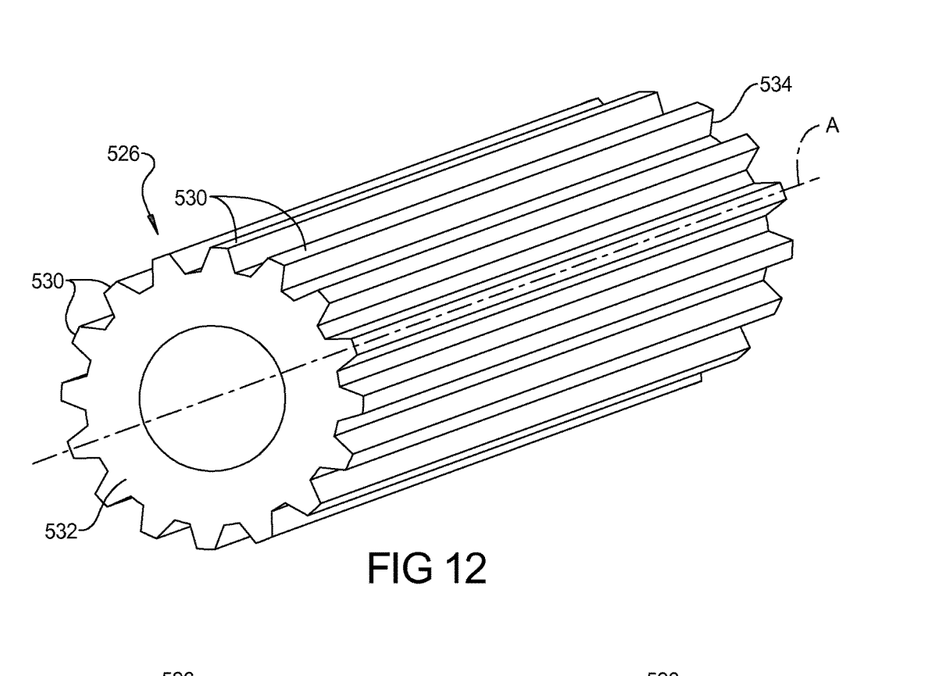
FIG. 12 is a perspective view of a set of fins of one of the cartridges of FIG. 11.
Figure 13:
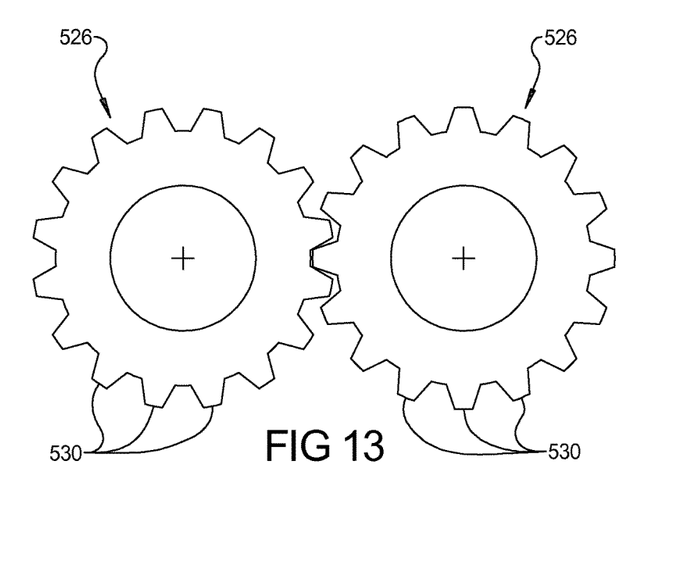
FIG. 13 is a side view of the sets of fins of the cartridges of FIG. 11.

Referring now to FIGS. 11-13, another set of cartridges 526 are provided that may be incorporated into the TEG system 14, 114, 214, 314 instead of or in addition to the cartridges 26, 426. Each of the cartridges 526 may include a plurality of fins 530 that facilitate the absorption of heat from exhaust gas flowing through the exhaust gas passageway 12, 112, 212, 312. While FIG. 11 depicts the TEG system 14, 114, 214, 314 having a pair of cartridges 526, it will be appreciated that the TEG system 14, 114, 214, 314 can have any number of cartridges 526. The fins 530 may be coated with one or more of the catalysts described above (e.g., TWC, PGM, LNT, HCLNC, SCR, etc.).

The fins 530 of each cartridge 526 can extend radially and can be arranged in a circular array extending around a longitudinal axis A. As shown in FIGS. 11 and 12, each fin 530 may extend in an axial direction (i.e., in a direction parallel to longitudinal axis A) from an upstream end 532 of the cartridge 526 to a downstream end 534 of the cartridge 526. In this manner, the fins 530 can be shaped similar to gear teeth.

The rotational axes A of the cartridges 526 may be substantially parallel to each other and parallel to a direction of exhaust gas flow through the exhaust gas passageway 12, 112, 212, 312, as shown in FIG. 11. As shown in FIG. 13, one or more fins 530 of a particular cartridge 526 can be overlapped with or interleaved with one or more fins 530 of one or more adjacent cartridges 526.

While not specifically shown in the drawings, it will be appreciated that any of the TEG systems 14, 114, 214, 314 could be disposed in an EGR (exhaust gas recirculation)

loop through which a portion of the exhaust gas in the passageway 12 is provide to an intake system of the engine 11.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
an aftertreatment component disposed in an exhaust gas passageway; and
thermoelectric generators disposed in the exhaust gas passageway upstream of the aftertreatment component, each of the thermoelectric generators having a catalytic coating and including a radially extending fin configured to absorb heat from exhaust gas in the exhaust gas passageway, the fin of at least one of the thermoelectric generators overlapping the fin of at least another one of the thermoelectric generators, wherein the fin of at least one of the thermoelectric generators is interleaved with the fin of at least another one of the thermoelectric generators.

2. The exhaust aftertreatment system of claim 1, wherein each of the thermoelectric generators includes a plurality of fins that extend radially outward and extend longitudinally from a first axial end of the thermoelectric generator to a second axial end of the thermoelectric generator.

3. The exhaust aftertreatment system of claim 1, wherein the fin of the at least one of the thermoelectric generators is disk-shaped.

4. The exhaust aftertreatment system of claim 1, wherein each thermoelectric generator has a plurality of disk-shaped fins spaced axially apart from each other.

5. The exhaust aftertreatment system of claim 1, wherein the fin of the at least one of the thermoelectric generators is helically-shaped.

6. The exhaust aftertreatment system of claim 5, wherein the helically-shaped fin is defined by a rotational axis that is perpendicular to a direction of flow through the exhaust gas passageway.

7. The exhaust aftertreatment system of claim 1, wherein each of the thermoelectric generators includes a plurality of helical fins.

8. The exhaust aftertreatment system of claim 7, wherein the plurality of helical fins of each thermoelectric generator are defined by a common rotational axis and are rotationally offset from each other and interleaved with each other.

9. The exhaust aftertreatment system of claim 1, wherein a catalyst of the catalytic coating is selected from the group consisting of: a three-way catalyst, a platinum-group metal catalyst, a lean $NO_x$ trap catalyst, and a hydrocarbon lean $NO_x$ catalyst.

10. The exhaust aftertreatment system of claim 1, wherein the aftertreatment component is selected from the group consisting of: an oxidation catalyst, a particulate filter, and a selective catalytic reduction catalyst.

11. The exhaust aftertreatment system of claim 1, wherein the thermoelectric generators are disposed upstream of a turbocharger.

12. The exhaust aftertreatment system of claim 11, wherein the thermoelectric generators are disposed upstream of a particulate filter.

13. The exhaust aftertreatment system of claim 1, wherein the thermoelectric generators are disposed downstream of a turbocharger and upstream of a particulate filter.

14. The exhaust aftertreatment system of claim 13, wherein the thermoelectric generators function as an oxidation catalyst.

15. The exhaust aftertreatment system of claim 1, wherein the thermoelectric generators are disposed downstream of a turbocharger and a particulate filter and upstream of a selective catalytic reduction catalyst.

16. An exhaust aftertreatment system comprising:
an aftertreatment component disposed in an exhaust gas passageway; and
thermoelectric generators disposed in the exhaust gas passageway downstream of the aftertreatment component, each of the thermoelectric generators having a catalytic coating and including a radially extending fin configured to absorb heat from exhaust gas in the exhaust gas passageway, the fin of at least one of the thermoelectric generators overlapping the fin of at least another one of the thermoelectric generators, wherein the fin of at least one of the thermoelectric generators is interleaved with the fin of at least another one of the thermoelectric generators.

17. The exhaust aftertreatment system of claim 16, wherein each of the thermoelectric generators includes a plurality of fins that extend radially outward and extend longitudinally from a first axial end of the thermoelectric generator to a second axial end of the thermoelectric generator.

18. The exhaust aftertreatment system of claim 16, wherein the fin of the at least one the thermoelectric generators is disk-shaped.

19. The exhaust aftertreatment system of claim 16, wherein each thermoelectric generator has a plurality of disk-shaped fins spaced axially apart from each other.

20. The exhaust aftertreatment system of claim 16, wherein the fin of the at least one the thermoelectric generators is helically-shaped.

21. The exhaust aftertreatment system of claim 20, wherein the helically-shaped fin is defined by a rotational axis that is perpendicular to a direction of flow through the exhaust gas passageway.

22. The exhaust aftertreatment system of claim 16, wherein each of the thermoelectric generators includes a plurality of helical fins.

23. The exhaust aftertreatment system of claim 22, wherein the plurality of helical fins of each thermoelectric generator are defined by a common rotational axis and are rotationally offset from each other and interleaved with each other.

24. The exhaust aftertreatment system of claim 16, wherein a catalyst of the catalytic coating is selected from the group consisting of: a three-way catalyst, a platinum-group metal catalyst, a lean $NO_x$ trap catalyst, and a hydrocarbon lean $NO_x$ catalyst.

25. The exhaust aftertreatment system of claim 16, wherein the aftertreatment component is selected from the group consisting of: an oxidation catalyst and a particulate filter.

26. The exhaust aftertreatment system of claim 16, wherein the thermoelectric generators are disposed downstream of a turbocharger and a particulate filter.

27. The exhaust aftertreatment system of claim 26, wherein the thermoelectric generators are disposed upstream of a selective catalytic reduction catalyst.

28. The exhaust aftertreatment system of claim 26, wherein the catalytic coating is a selective catalytic reduction coating.

29. An exhaust aftertreatment system comprising:
an exhaust gas passageway receiving exhaust gas from a combustion engine; and
a thermoelectric generator system disposed in the exhaust gas passageway and including a plurality of catalyst-coated cartridges each having a fin configured to absorb heat from the exhaust gas in the exhaust gas passageway, at least one of the fins being defined by a rotational axis that is perpendicular to a direction of flow through the exhaust gas passageway, the fin of at least one of the plurality of cartridges overlapping the fin of at least another one of the plurality of cartridges, wherein the fin of at least one of the plurality of cartridges is interleaved with the fin of at least another one of the plurality of cartridges.

30. The exhaust aftertreatment system of claim 29, wherein each fin has a helical shape extending around a corresponding rotational axis.

31. The exhaust aftertreatment system of claim 29, wherein each of the plurality of cartridges includes a plurality of helical fins that are interleaved with each other.

32. The exhaust aftertreatment system of claim 31, wherein the plurality of helical fins of each of the plurality of cartridges are defined by a common rotational axis and are rotationally offset from each other.

33. The exhaust aftertreatment system of claim 32, wherein the thermoelectric generator system is disposed upstream of a turbocharger.

34. The exhaust aftertreatment system of claim 33, wherein the thermoelectric generator system is disposed upstream of a particulate filter.

35. The exhaust aftertreatment system of claim 34, wherein the thermoelectric generator system functions as an oxidation catalyst.

36. The exhaust aftertreatment system of claim 32, wherein the thermoelectric generator system is disposed downstream of a turbocharger and upstream of a particulate filter.

37. The exhaust aftertreatment system of claim 32, wherein the thermoelectric generator system is disposed downstream of a turbocharger and a particulate filter and upstream of a selective catalytic reduction catalyst.

38. The exhaust aftertreatment system of claim 29, wherein the plurality of cartridges are coated with a catalyst selected from the group consisting of: a three-way catalyst, a platinum-group metal catalyst, a lean $NO_x$ trap catalyst, a hydrocarbon lean $NO_x$ catalyst, and a selective catalytic reduction catalyst.

* * * * *